(12) United States Patent
Huang et al.

(10) Patent No.: US 8,787,436 B2
(45) Date of Patent: Jul. 22, 2014

(54) METHOD AND APPARATUS FOR REDUCING POWER CONSUMPTION OF COMMUNICATION DEVICE

(75) Inventors: Liang-Wei Huang, Hsinchu (TW); Fang-Ru Wang, Taipei (TW); Ting-Fa Yu, Yunlin County (TW); Chien-Sheng Lee, Miaoli County (TW)

(73) Assignee: Realtek Semiconductor Corp., Hsinchu (TW)

( * ) Notice: Subject to any disclaimer, the term of this patent is extended or adjusted under 35 U.S.C. 154(b) by 307 days.

(21) Appl. No.: 13/336,690

(22) Filed: Dec. 23, 2011

(65) Prior Publication Data

US 2012/0170637 A1    Jul. 5, 2012

(30) Foreign Application Priority Data

Dec. 29, 2010   (TW) ................ 99146590 A

(51) Int. Cl.
 *H03H 7/30*   (2006.01)
 *H03H 7/40*   (2006.01)
(52) U.S. Cl.
 USPC ............................ 375/231; 375/232; 375/350
(58) Field of Classification Search
 USPC ........................................ 375/231, 232, 350
 See application file for complete search history.

(56) References Cited

U.S. PATENT DOCUMENTS

| | | | |
|---|---|---|---|
| 7,197,094 B2 | 3/2007 | Tung | |
| 7,773,480 B2 | 8/2010 | Huang et al. | |
| 8,520,553 B2 * | 8/2013 | Yousefi et al. | 370/255 |
| 8,537,886 B1 * | 9/2013 | Su et al. | 375/233 |
| 2009/0141745 A1 * | 6/2009 | Huang et al. | 370/503 |
| 2009/0161803 A1 * | 6/2009 | Huang et al. | 375/345 |
| 2009/0225912 A1 * | 9/2009 | Shih et al. | 375/346 |
| 2010/0086011 A1 * | 4/2010 | Liu | 375/219 |
| 2010/0091640 A1 * | 4/2010 | Huang et al. | 370/201 |
| 2013/0028299 A1 * | 1/2013 | Tsai | 375/219 |

FOREIGN PATENT DOCUMENTS

| | | |
|---|---|---|
| CN | 1482747 A | 3/2004 |
| CN | 101303873 A | 11/2008 |
| TW | I299825 | 11/1994 |

OTHER PUBLICATIONS

IEEE Standard for Local and Metropolitan Area Networks—Specific requirements—Part 3: CSMA/CD Method and Physical Layer Specifications—Amendment 5: Media Access Control Parameters, Physical Layers, and Management Parameters for Energy-Efficient Ethernet, IEEE std 802.3az, IEEE, 2010.*

* cited by examiner

*Primary Examiner* — Shuwang Liu
*Assistant Examiner* — Nader Bolourchi
(74) *Attorney, Agent, or Firm* — Birch, Stewart, Kolasch & Birch, LLP

(57) ABSTRACT

A communication device is disclosed including: an analog-to-digital converter (ADC) for converting an analog input signal into a digital input signal; an equalizer module coupled with the ADC for processing the digital input signal to generate an equalized signal; a data slicer coupled with the equalizer module for generating an output signal based on the equalized signal; and a control unit coupled with the equalizer module and the data slicer; wherein the control unit or the equalizer module preserves at least one signal equalizing parameter of the equalizer module before the equalizer module enters power saving mode, and the equalizer module loads the at least one signal equalizing parameter to operate when the communication device receives a predetermined control signal.

9 Claims, 2 Drawing Sheets

METHOD AND APPARATUS FOR REDUCING POWER CONSUMPTION OF COMMUNICATION DEVICE

CROSS-REFERENCE TO RELATED APPLICATIONS

This application claims the benefit of priority to Taiwanese Patent Application No. 099146590, filed on Dec. 29, 2010; the entirety of which is incorporated herein by reference for all purposes.

BACKGROUND

The present disclosure generally relates to communication devices, and more particularly, to method and apparatus for reducing power consumption of a communication device.

As the requirement of transmission rate continuously increases, a communication device, such as an Ethernet device, causes more power consumption and generates more waste heat correspondingly. Therefore, the energy utilization efficiency of the communication device has become a crucial issue than ever before.

IEEE std 802.3az Standard is also called as "Energy Efficient Ethernet (EEE)" (see "IEEE Standard for Local and Metropolitan Area Networks—Specific requirements—Part 3: CSMA/CD Method and Physical Layer Specifications—Amendment 5: Media Access Control Parameters, Physical Layers, and Management Parameters for Energy-Efficient Ethernet, IEEE std 802.3az, IEEE, 2010"); which is hereby incorporated by reference in its entirety. For example, in the IEEE 802.3az standard that defines Energy Efficient Ethernet (EEE) specification, a transceiver of the Ethernet device is allowed to enter a Quiet mode when there is no data needed to be transmitted. In the Quiet mode, the Ethernet device needs not to continuously transmit idle sequences, and thus the power consumption can be reduced.

After leaving the Quiet mode, however, the transceiver of the Ethernet device is required to complete the preparation for data receiving operation in a very short period in order to ensure the data transmission performance. Such requirement greatly increases the difficulty of designing the transceiver, so it is very difficult for the Ethernet device to achieve high transmission performance while maintaining high energy utilization efficiency in terms of circuitry design.

SUMMARY

In view of the foregoing, it can be appreciated that a substantial need exists for a transceiver architecture that can achieve high transmission performance while maintaining high energy utilization efficiency.

An example embodiment of a communication device is disclosed comprising: an analog-to-digital converter (ADC) for converting an analog input signal into a digital input signal; an equalizer module coupled with the ADC for processing the digital input signal to generate an equalized signal; a data slicer coupled with the equalizer module for generating an output signal based on the equalized signal; and a control unit coupled with the equalizer module and the data slicer; wherein the control unit or the equalizer module preserves at least one signal equalizing parameter of the equalizer module before the equalizer module enters power saving mode, and the equalizer module loads the at least one signal equalizing parameter to operate when the communication device receives a predetermined control signal.

An example embodiment of a method for reducing power consumption of a communication device is disclosed. The method comprises: utilizing an analog-to-digital converter (ADC) to convert an analog input signal into a digital input signal; utilizing an equalizer module to process the digital input signal to generate an equalized signal; generating an output signal based on the equalized signal; and preserving at least one signal equalizing parameter of the equalizer module before the equalizer module enters power saving mode; switching the equalizer module to power saving mode when receiving a power saving mode enable command; and loading the at least one signal equalizing parameter to operate the equalizer module when receiving a predetermined control signal.

Another example embodiment of a communication device is disclosed comprising: a receiving circuit; and a control unit coupled with the receiving circuit; wherein the control unit or the receiving circuit preserves at least one signal equalizing parameter of the receiving circuit before the receiving circuit enters power saving mode, and the receiving circuit loads the at least one signal equalizing parameter to operate when the communication device receives a predetermined control signal.

Another example embodiment of a method for reducing power consumption of a communication device is disclosed. The method comprises: preserving at least one signal equalizing parameter of a receiving circuit of the communication device before the receiving circuit enters power saving mode; switching the receiving circuit to power saving mode when receiving a power saving mode enable command; and loading the at least one signal equalizing parameter to operate the receiving circuit when receiving a predetermined control signal.

It is to be understood that both the foregoing general description and the following detailed description are example and explanatory only and are not restrictive of the disclosure, as claimed.

DETAILED DESCRIPTION

Reference will now be made in detail to embodiments of the disclosure, which are illustrated in the accompanying drawings. The same reference numbers may be used throughout the drawings to refer to the same or like parts or components.

Certain terms are used throughout the description and following claims to refer to particular components. As one skilled in the art will appreciate, vendors may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . " Also, the phrase "coupled with" is intended to compass any indirect or direct connection. Accordingly, if this document mentioned that a first device is coupled with a second device, it means that the first device may be directly or indirectly connected to the second device through an electrical connection, wireless communications, optical communications, or other signal connections with/without other intermediate devices or connection means.

Figure 1:
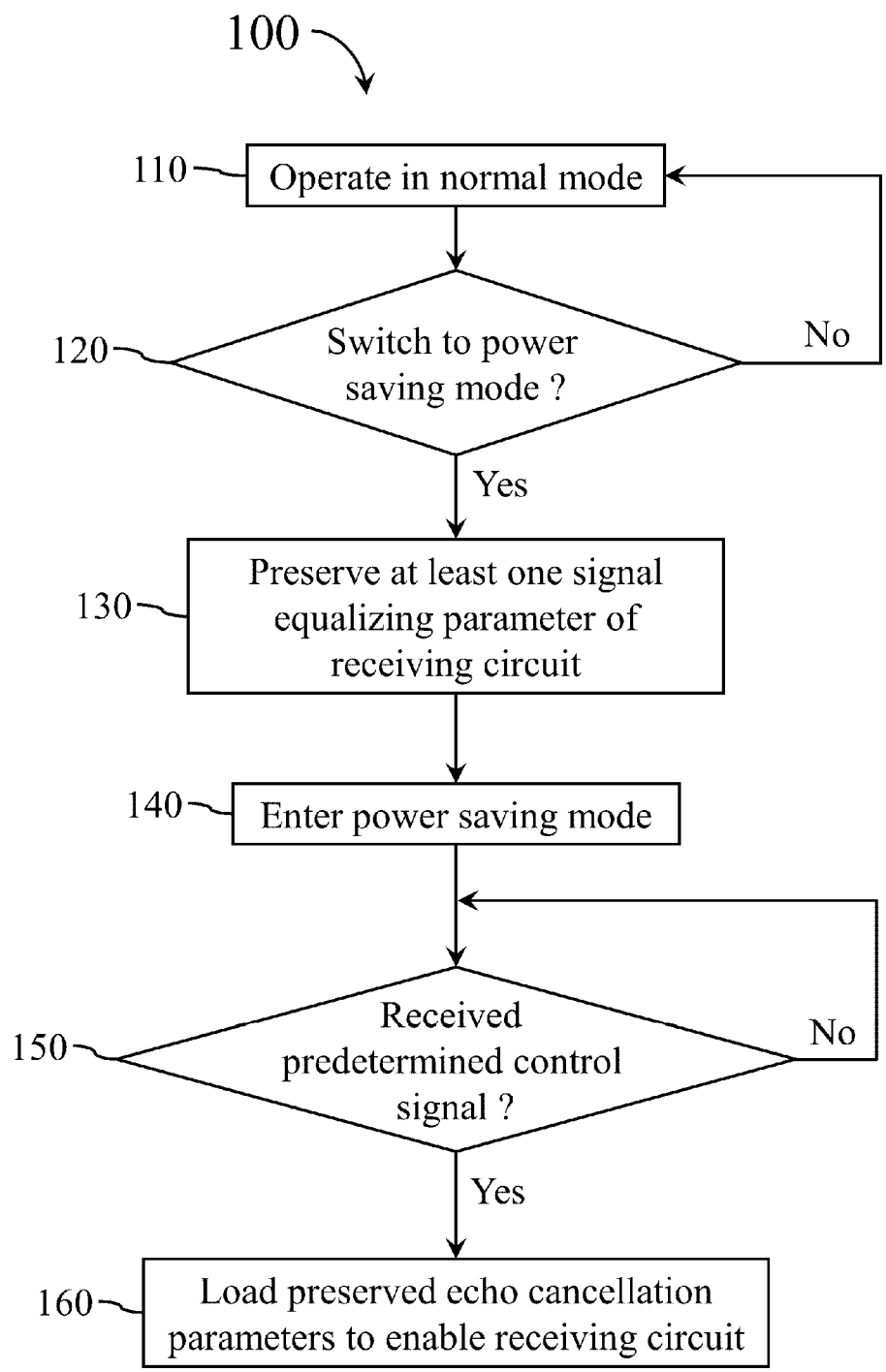
FIG. 1 is a simplified flowchart illustrating a method for reducing power consumption of a communication device in accordance with an example embodiment.

FIG. 1 is a simplified flowchart 100 illustrating a method for reducing power consumption of a communication device in accordance with an example embodiment. The operations of the flowchart 100 will be described with reference to FIG. 2.

Figure 2:
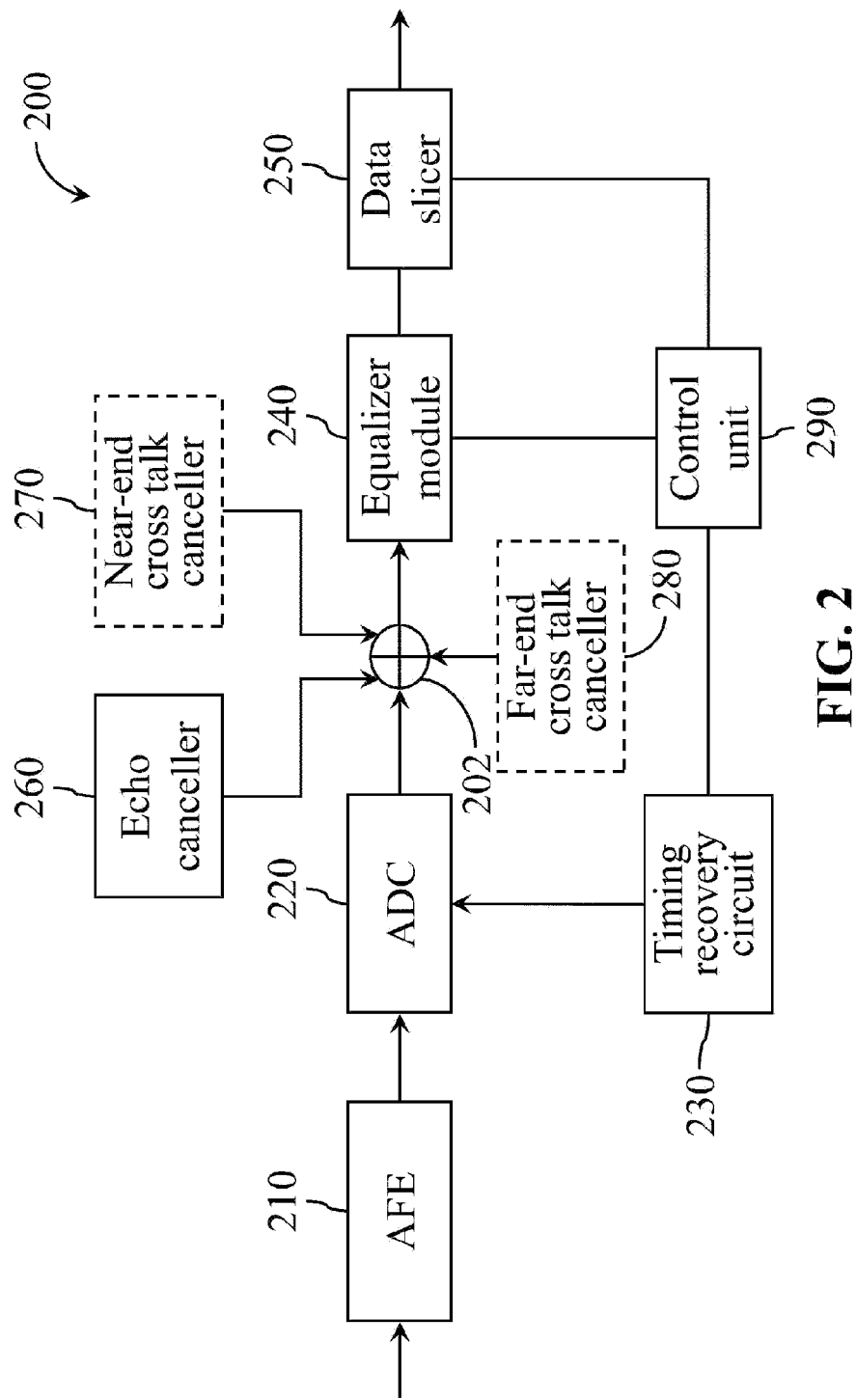
FIG. 2 is a simplified partial functional block diagram of a communication device according to an example embodiment.

FIG. 2 shows a simplified partial functional block diagram of a receiving circuit 200 of a communication device according to an example embodiment. As shown in FIG. 2, the receiving circuit 200 an analog-front-end (AFE) circuit 210, an analog-to-digital converter (ADC) 220, a timing recovery circuit 230, an equalizer module 240, a data slicer 250, an echo canceller 260, a near-end cross talk canceller 270, a far-end cross talk canceller 280, and a control unit 290.

In implementations, the timing recovery circuit 230 may be realized with various phase-locked loop circuits, such as analog PLL circuit, digital PLL circuit, or hybrid PLL circuit. The equalizer module 240 may comprise a number of components such as a feed forward equalizer, a feed back equalizer, and/or a gain amplifier. The data slicer 250 may be implemented with various approaches. For example, the data slicer 250 may calculate simply based on the magnitude of the equalized signal from the equalizer module 240 to obtain an output signal. Alternatively, the function of the data slicer 250 may be realized with a Viterbi decoder, a turbo decoder, or the like.

In practical applications, the receiving circuit 200 may be part of the transceiver of a 10 GBASE-T (or higher speed) Ethernet device. Different functional blocks of the receiving circuit 200 may be integrated into a single circuit chip.

In operation 110, the receiving circuit 200 operates in normal mode. For example, the AFE circuit 210 receives and processes an analog input signal in the operation 110 to generate a processed analog input signal. The ADC 220 operates based on a working clock provided by the timing recovery circuit 230 to convert the processed analog input signal into a digital input signal. The equalizer module 240 coupled with the ADC 220 then processes the digital input signal to generate an equalized signal. The data slicer 250 coupled with the equalizer module 240 generates an output signal based on the equalized signal generated from the equalizer module 240. In other words, the AFE circuit 210, the ADC 220, the equalizer module 240, and the data slicer 250 constitute a main signal processing path for the analog input signal received by the receiving circuit 200. In addition, the echo canceller 260 generates an echo cancellation signal, the near-end cross talk canceller 270 generates a near-end cross talk cancellation signal, and the far-end cross talk canceller 280 generates a far-end cross talk cancellation signal.

In the embodiment of FIG. 2, the echo cancellation signal, the near-end cross talk cancellation signal, and the far-end cross talk cancellation signal are applied to the signal path between the ADC 220 and the equalizer module 240 via an adder 202. This is merely an example embodiment, not a restriction of the practical implementations. In practice, the echo cancellation signal, the near-end cross talk cancellation signal, and the far-end cross talk cancellation signal may be jointly or separately applied to other locations on the signal processing path. For example, the echo cancellation signal, the near-end cross talk cancellation signal, and the far-end cross talk cancellation signal may be applied to the signal path between the equalizer module 240 and the data slicer 250, to the signal path between the AFE circuit 210 and the ADC 220, or to an appropriate location within the ADC 220 via an appropriate circuit, such as an adder. In another embodiment, the echo cancellation signal and the near-end cross talk cancellation signal may be jointly applied to the signal path between the AFE circuit 210 and the ADC 220, and the far-end cross talk cancellation signal may be applied to the signal path between the ADC 220 與 the equalizer module 240.

In operation 120, the receiving circuit 200 decides whether to switch to power saving mode. The term "power saving mode" mentioned herein may refer to the Quiet mode defined in the EEE series standard, or other energy saving mode defined in other energy-saving standards or defined by any system developer. In other words, the method described in the flowchart 100 is not only applicable to the communication devices complying with the EEE series standard, but also applicable to the communication devices supporting other self-defined energy saving mode.

In implementations, the receiving circuit 200 may decide whether to switch to power saving mode based on information received from a MAC circuit (not shown) or PCS circuit (not shown) of the communication device. In one embodiment, for example, the receiving circuit 200 proceeds to operation 130 when received a low power idle (LPI) control command defined in the EEE series standard from the MAC circuit. In another embodiment, the receiving circuit 200 may proceed to operation 130 when received a predetermined command from the control unit 290 or other components of the communication device.

In operation 130, the control unit 290 or the equalizer module 240 preserves at least one signal equalizing parameter of the equalizer module 240. In one embodiment, the control unit 290 may stop updating the equalizer module 240 in operation 130 so as to make the equalizer module 240 to preserve the signal equalizing parameters as of the time, such as partial or all coefficients of the feed forward equalizer, the feed back equalizer, and/or the gain amplifier within the equalizer module 240. In another embodiment, the control unit 290 may preserve the signal equalizing parameters of the equalizer module 240 as of the time in other storage unit, such as registers or a memory.

In addition, the control unit 290 or the echo canceller 260 preserves at least one echo cancellation parameter of the echo canceller 260, i.e., partial or all coefficients of the echo canceller 260, in operation 130. In implementations, the control unit 290 may stop updating the echo canceller 260 so as to make the echo canceller 260 to preserve the echo cancellation parameters as of the time. Alternatively, the control unit 290 may preserve the echo cancellation parameters as of the time in other storage unit, such as registers or a memory.

Similarly, the control unit 290 or the near-end cross talk canceller 270 preserves at least one near-end cross talk cancellation parameter of the near-end cross talk canceller 270, i.e., partial or all coefficients of the near-end cross talk canceller 270. In implementations, the control unit 290 may stop updating the near-end cross talk canceller 270 so as to make the near-end cross talk canceller 270 to preserve the near-end cross talk cancellation parameters as of the time. Alternatively, the control unit 290 may preserve the near-end cross talk cancellation parameters of the near-end cross talk canceller 270 as of the time in other storage unit, such as registers or a memory.

Additionally, the control unit 290 or the far-end cross talk canceller 280 preserves at least one far-end cross talk cancellation parameter of the far-end cross talk canceller 280, i.e., partial or all coefficients of the far-end cross talk canceller 280, in operation 130. In implementations, the control unit 290 may stop updating the far-end cross talk canceller 280 so as to make the far-end cross talk canceller 280 to preserve the far-end cross talk cancellation parameters as of the time. Alternatively, the control unit 290 may preserve the far-end cross talk cancellation parameters of the far-end cross talk canceller 280 as of the time in other storage unit, such as registers or a memory.

Then, the receiving circuit 200 performs operation 140 to enter power saving mode to reduce the power consumption. In power saving mode, the receiving circuit 200 turns off some components, i.e., to make these components to enter power saving mode. For example, the receiving circuit 200 may turn off the AFE circuit 210, the ADC 220, the timing recovery circuit 230, the equalizer module 240, the data slicer 250, the echo canceller 260, the near-end cross talk canceller 270, and/or the far-end cross talk canceller 280 to reduce the power consumption of the receiving circuit 200.

In operation 150, the receiving circuit 200 decides whether to stay in power saving mode based on whether it receives any predetermined control signal. If the receiving circuit 200 received a predetermined control signal, the receiving circuit 200 proceeds to operation 160. Otherwise, the receiving circuit 200 continues to stay in power saving mode. In one embodiment, the predetermined control signal is a Refresh signal, an Alert signal, or a Wake Up signal defined in the EEE standard. In another embodiment, the predetermined control signal is a control signal defined by other standards or system developers.

In operation 160, those components of the receiving circuit 200 that previously entered power saving mode begin to operate. The receiving circuit 200 is allowed to receive data from other communication devices only if the parameter adjustments of those components are completed. To reduce the required time for preparation of data receiving, the equalizer module 240 would load the signal equalizing parameters preserved in operation 130 to operate when leaving power saving mode. That is, when the equalizer module 240 leaves power saving mode, the equalizer module 240 utilizes the signal equalizing parameters obtained before entering power saving mode to operate without spending extra time to recalibrate the signal equalizing parameters.

In operation 160, the echo canceller 260 loads the echo cancellation parameters preserved in operation 130, i.e., the echo cancellation parameters obtained before entering power saving mode, to operate without spending extra time to recalibrate the echo cancellation parameters. The near-end cross talk canceller 270 may load the near-end cross talk cancellation parameters preserved in operation 130, i.e., the near-end cross talk cancellation parameters obtained before entering power saving mode, to operate without spending extra time to recalibrate the near-end cross talk cancellation parameters. Similarly, the far-end cross talk canceller 280 may load the far-end cross talk cancellation parameters preserved in operation 130, i.e., the far-end cross talk cancellation parameters obtained before entering power saving mode, to operate without spending extra time to recalibrate the far-end cross talk cancellation parameters.

Accordingly, when received the predetermined control signal, the receiving circuit 200 is able to begin data transmission once the phase selection of the clock signals outputted from the timing recovery circuit 230 is complete. In one embodiment, the control unit 290 controls the timing recovery circuit 230 to switch among a plurality of output clock signals of different phases in operation 160. The control unit 290 controls the timing recovery circuit 230 to select one of the plurality of clock signals to be the working clock of the ADC 220 according to the error value of the output signal generated by the data slicer 250. For example, assuming that the timing recovery circuit 230 is able to generate 64 clock signals of different phases, the control unit 290 may control the timing recovery circuit 230 to switch the output clock signal among the 64 phases or among some of the 64 phases (e.g., only 32 phases thereof). Then, the control unit 290 may select one clock signal that corresponds to the minimized error value of the output signal from those output clock signals to be the working clock of the ADC 220.

In another embodiment, the control unit 290 or the timing recovery circuit 230 further preserves the frequency parameters of the timing recovery circuit 230 in operation 130. Thus, the timing recovery circuit 230 may load the frequency parameters preserved in operation 130 to restart operation, and then the control unit 290 decides the best phase of the working clock generated by the timing recovery circuit 230 in the way described previously.

As described above, when the receiving circuit 200 received a predetermined control signal to leave power saving mode, the receiving circuit 200 is able to begin data transmission with other communication devices once the control unit 290 completes the phase selection of the output clock signal generated from the timing recovery circuit 230. There is no need to spend extra time to recalibrate the coefficients of the equalizer module 240, the echo canceller 260, the near-end cross talk canceller 270, and the far-end cross talk canceller 280. As a result, the latency of the receiving circuit 200 from leaving power saving mode to begin data transmission can be significantly reduced. Therefore, the receiving circuit 200 is able to support energy saving operation like that defined in EEE series standard without adversely affecting the data transmission performance of the Ethernet device.

In the foregoing descriptions, it is assumed that the receiving circuit 200 is employed as part of the transceiver of a 10 GBASE-T Ethernet device (or even higher speed Ethernet device) to describe the operations of the flowchart 100. This is merely an embodiment, not a restriction of the practical applications.

In practice, some embodiments may utilize only some functional blocks of the receiving circuit 200 as part of a transceiver. For example, in some embodiments where the receiving circuit 200 is employed as part of the transceiver of a 1000 GBASE-T Ethernet device, the far-end cross talk canceller 280 of FIG. 2 may be omitted if it is not required by the 1000 GBASE-T Ethernet device. In some embodiments where the receiving circuit 200 is employed as part of the transceiver of a 100 GBASE-TX Ethernet device, the echo canceller 260, the near-end cross talk canceller 270, and the far-end cross talk canceller 280 of FIG. 2 can be omitted if they are not required by the 100 GBASE-TX Ethernet device.

As is well known in the art, not all wired communication standards have defined corresponding energy saving operation modes. For example, there is no definition of energy saving operations in High definition multimedia interfaces (HDMI) Ethernet Channel (HEC) communication series standard, and thus traditional HEC communication devices do not support energy saving operations.

As mentioned previously, the method for reducing power consumption for communication devices illustrated in the flowchart 100 is not only applicable to communication devices supporting EEE series standard, but also applicable to other communication devices supporting the power saving mode defined by other system developers. In other words, the method described in the flowchart 100 can also be applied to the circuit design of other communications devices to improve their power utilization efficiency even if the industrial communication standards of these communication devices, such as the HEC standard, do not specify related energy saving operations.

For example, some functional blocks of the receiving circuit 200 may be utilized as part of a transceiver of a HEC communication device. If the HEC communication device requires echo cancellation mechanism, but not cross talk cancellation mechanism, the near-end cross talk canceller 270 the far-end cross talk canceller 280 of FIG. 2 can be omitted. In this embodiment, the receiving circuit 200 may operate slightly different in operations 130 and 160 of the flowchart 100 compared to the previous embodiments, and the operations of the receiving circuit 200 in operations 130 and 160 will be described below.

In operation 130, the control unit 290 or the echo canceller 260 preserves a plurality of echo cancellation parameter sets of the echo canceller 260. In this embodiment, the control unit 290 or the echo canceller 260 preserves a plurality of echo cancellation parameter sets corresponding to a plurality of clock signals of different phases of the timing recovery circuit 230. For example, assuming that the timing recovery circuit 230 is able to generate 64 clock signals of different phases, the control unit 290 or the echo canceller 260 may preserve 64 echo cancellation parameter sets corresponding to the 64 clock signals of different phases. Alternatively, the control unit 290 or the echo canceller 260 may only preserve some echo cancellation parameter sets, such as 32 or 16 echo cancellation parameter sets, corresponding to part of the 64 clock signals. In implementations, the control unit 290 or the echo canceller 260 may collect above echo cancellation parameter sets of the echo canceller 260 during the normal operations of the echo canceller 260 in operation 110, and preserve these parameter sets in storage units, such as registers or a memory.

In operation 160, the receiving circuit 200 leaves power saving mode, and some components thereof that previously entered power saving mode begin to operate. Similar to the embodiments described previously, the equalizer module 240 may load the signal equalizing parameters preserved in operation 130 to operate when leaving power saving mode. That is, when the equalizer module 240 leaves power saving mode, the equalizer module 240 may simply utilize the signal equalizing parameters obtained before entering power saving mode to operate without spending extra time to recalibrate the signal equalizing parameters.

Then, the control unit 290 controls the timing recovery circuit 230 to switch among a plurality of output clock signals of different phases. When the timing recovery circuit 230 switches to a candidate clock signal of the plurality of clock signals, the equalizer module 240 loads a signal equalizing parameter set corresponding to the candidate clock signal from those parameter sets preserved in operation 130 to operate. When the timing recovery circuit 230 switches to another candidate clock signal, the equalizer module 240 loads another corresponding signal equalizing parameter set to operate, and so forth. That is, when the timing recovery circuit 230 switches among the plurality of lock signals, the echo canceller 260 also switches among the plurality of signal equalizing parameter sets correspondingly. During the switching operations of the timing recovery circuit 230, the control unit 290 observes the error values of the output signals generated from the data slicer 250, and then decides a best phase of the working clock for the ADC 220 and decides best echo cancellation parameter set for the echo canceller 260.

In this embodiment, the control unit 290 selects a pairing of clock signal and echo cancellation parameter set that can minimize the error value of the output signal to be the working clock and the best echo cancellation parameter set for the echo canceller 260.

Similar to the previous embodiments, if the receiving circuit 200 leaves power saving mode when received a predetermined control signal, the receiving circuit 200 needs not to spend extra time to recalibrate the coefficients of the equalizer module 240. As a result, the latency of the receiving circuit 200 from leaving power saving mode to get ready for data transmission can be significantly reduced. Accordingly, the HEC communication device where the receiving circuit 200 resides is able to support energy saving operation like that defined in EEE series standard to reduce power consumption without adversely affecting the data transmission performance.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A communication device comprising:
   an analog-to-digital converter (ADC) for converting an analog input signal into a digital input signal;
   an equalizer module, coupled with the ADC, for processing the digital input signal to generate an equalized signal;
   a data slicer, coupled with the equalizer module, for generating an output signal based on the equalized signal;
   a timing recovering circuit for providing a working clock to the ADC; and
   a control unit coupled with the equalizer module and the data slicer;
   wherein the control unit or the equalizer module preserves at least one signal equalizing parameter of the equalizer module before the equalizer module enters power saving mode, and the equalizer module loads the at least one signal equalizing parameter to operate when the communication device receives a predetermined control signal;
   wherein when the communication device receives the predetermined control signal, the control unit controls the timing recovering circuit to select a clock signal from a plurality of clock signals of different phases to be the working clock according to an error value of the output signal.

2. The communication device of claim 1, wherein the control unit preserves at least one signal equalizing parameter of the equalizer module by stop updating the equalizer module.

3. The communication device of claim 1, further comprising:
   an echo canceller for generating and applying an echo cancellation signal to a signal processing path of the analog input signal;
   wherein the control unit or the echo canceller preserves at least one echo cancellation parameter of the echo canceller before the echo canceller enters power saving mode, and the echo canceller loads the at least one echo cancellation parameter to operate when the communication device receives the predetermined control signal.

4. The communication device of claim 3, wherein control unit or the echo canceller preserves a plurality of echo cancellation parameter sets corresponding to the plurality of clock signals of different phases before the echo canceller enters power saving mode, and when the timing recovering circuit switches to a candidate clock signal of the plurality of clock signals, the echo canceller loads an echo cancellation parameter set corresponding to the candidate clock signal from the plurality of echo cancellation parameter sets to operate.

5. The communication device of claim 3, further comprising:
  a near-end cross talk canceller for generating and applying a near-end cross talk cancellation signal to the signal processing path of the analog input signal;
  wherein the control unit or the near-end cross talk canceller preserves at least one near-end cross talk cancellation parameter of the near-end cross talk canceller before the near-end cross talk canceller enters power saving mode, and the near-end cross talk canceller loads the at least one near-end cross talk cancellation parameter to operate when the communication device receives the predetermined control signal.

6. The communication device of claim 5, further comprising:
  a far-end cross talk canceller for generating and applying a far-end cross talk cancellation signal to the signal processing path of the analog input signal;
  wherein the control unit or the far-end cross talk canceller preserves at least one far-end cross talk cancellation parameter of the far-end cross talk canceller before the far-end cross talk canceller enters power saving mode, and the far-end cross talk canceller loads the at least one far-end cross talk cancellation parameter to operate after the working clock is decided.

7. The communication device of claim 1 is a communication device complying with the High definition multimedia interfaces (HDMI) Ethernet Channel (HEC) series standard.

8. The communication device of claim 1, wherein the predetermined control signal comprises a Refresh signal, an Alert signal, or a Wake Up signal.

9. A communication device comprising:
  an analog-to-digital converter (ADC) for converting an analog input signal into a digital input signal;
  an equalizer module, coupled with the ADC, for processing the digital input signal to generate an equalized signal;
  a data slicer, coupled with the equalizer module, for generating an output signal based on the equalized signal;
  a timing recovering circuit for providing a working clock to the ADC; and
  a control unit coupled with the equalizer module and the data slicer;
  wherein the control unit or the equalizer module preserves at least one signal equalizing parameter of the equalizer module before the equalizer module enters power saving mode, and the equalizer module loads the at least one signal equalizing parameter to operate when the communication device receives a predetermined control signal;
  wherein the control unit or the timing recovering circuit preserves a frequency parameter of the timing recovering circuit before the timing recovering circuit enters power saving mode, and the timing recovering circuit loads the preserved frequency parameter to operate when the communication device receives the predetermined control signal.

* * * * *